(No Model.)
S. DARLING.
VERNIER SCALE.
No. 442,020. Patented Dec. 2, 1890.
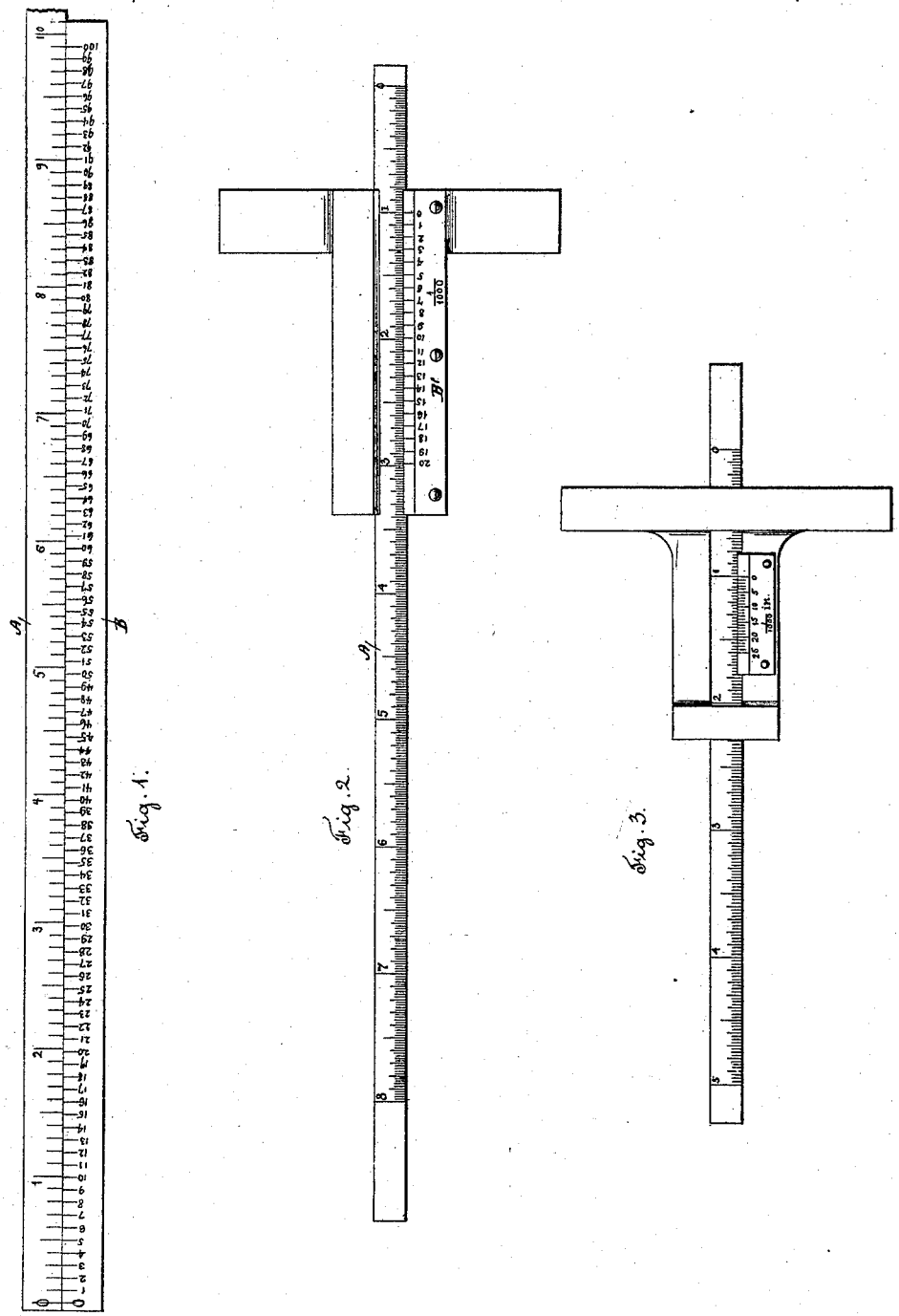
Witnesses
Chas. F. Schmelz.
James W. Beaman
Inventor
Samuel Darling
By his Attorney
S. Scholfield

UNITED STATES PATENT OFFICE.

SAMUEL DARLING, OF PROVIDENCE, RHODE ISLAND.

VERNIER-SCALE.

SPECIFICATION forming part of Letters Patent No. 442,020, dated December 2, 1890.

Application filed March 22, 1890. Serial No. 344,967. (No model.)

*To all whom it may concern:*

Be it known that I, SAMUEL DARLING, a citizen of the United States, residing at Providence, in the State of Rhode Island, have invented a new and useful Improvement in Vernier-Scales for Measuring-Instruments, of which the following is a specification.

In vernier-scales as ordinarily constructed the graduations of the vernier are so fine and close together that it is very difficult to read the indicated measurement, and it is the object of my invention to provide a finely-divided measuring-scale with a coarsely-graduated vernier, whereby the indicated fractional measurement can be readily distinguished and read; and my invention consists in the employment of a vernier-scale, which is a fractional part only, of a regular vernier for large subdivisions of the measuring-scale, the said large subdivisions being subdivided into a number of parts equal to the number of times the length of the vernier taken for use is contained in the whole length of the regular vernier-scale for the large subdivisions.

Figure 1 represents a measuring-scale having comparatively large subdivisions and a regular vernier for the same. Fig. 2 represents a depth-gage-measuring instrument having a vernier made according to my improvement. Fig. 3 represents a depth-gage-measuring instrument provided with a vernier as heretofore constructed.

In the accompanying drawings, A in Fig. 1 represents a portion of a measuring-scale in which the inch divisions of the scale are divided into ten parts, so that a space of ten inches will be divided into one hundred parts, and B represents an ordinary vernier-scale, which is adapted to indicate the one-thousandth part of an inch upon the scale A, the said vernier-scale B being formed by the division of ninety-nine of the parts of the scale A into one hundred divisions, as in the ordinary construction of vernier-scales, and in order to preserve the comparatively coarse subdivisions of the vernier-scale and reduce the same to a convenient length for use in measuring-instruments of various kinds I take an evenly-divided fractional part of the vernier-scale—as, for instance, one-fifth part, as shown at B' in Fig. 2—and then subdivide the divisions of the scale A into as many parts as the length of the vernier-scale B' is contained in the whole length of the corresponding vernier-scale B, and by this means I am enabled to produce a vernier-scale the fractional indications of which can be read with great facility. If one-half of the length of the vernier-scale B had been taken for the length of the scale B' instead of one-fifth, then the original subdivisions of the scale A should be divided into two parts in order to adapt the vernier to indicate the measurement of thousandths, and if one-quarter of the said length had been taken then the subdivisions should be divided into four parts to preserve the proper relation between the vernier and measuring scales. A depth-gage-measuring instrument provided with a vernier, as heretofore constructed, is shown in Fig. 3, in which the measuring and vernier scales are adapted to indicate thousandths, as in the scale shown in Fig. 2; but in the former figure the indicating vernier-lines are so close to each other that the fractional measurements are not readily distinguishable, while in Fig. 2 the same fractional measurements can be plainly discerned.

I claim as my invention—

A measuring-instrument having a fractional part only of a regular vernier-scale, combined with a standard measuring-scale in which the larger subdivisions, which correspond to the divisions of the entire vernier-scale, are subdivided into a number of parts equal to the number of times the length of the portion of the vernier taken for use is contained in the whole length of the regular vernier-scale, substantially as described.

SAML. DARLING.

Witnesses:
JOHN S. LYNCH,
SOCRATES SCHOLFIELD.